United States Patent
Shirai

(10) Patent No.: US 10,663,059 B2
(45) Date of Patent: May 26, 2020

(54) AUTOMATIC TRANSMISSION CONTROLLER

(71) Applicant: DENSO CORPORATION, Kariya, Aichi-pref. (JP)

(72) Inventor: Akihiro Shirai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/257,281

(22) Filed: Jan. 25, 2019

(65) Prior Publication Data
US 2019/0234513 A1 Aug. 1, 2019

(30) Foreign Application Priority Data
Feb. 1, 2018 (JP) .................................. 2018-16393

(51) Int. Cl.
*F16H 61/02* (2006.01)

(52) U.S. Cl.
CPC ..... *F16H 61/0206* (2013.01); *F16H 61/0251* (2013.01); *F16H 2061/0209* (2013.01); *F16H 2061/0255* (2013.01)

(58) Field of Classification Search
CPC .. F16H 61/02; F16H 61/0206; F16H 61/0251; F16H 2061/0209; F16H 2061/0255
See application file for complete search history.

(56) References Cited

U.S. PATENT DOCUMENTS

| 5,513,104 | A | * | 4/1996 | Tsutsui | F16H 61/08 477/63 |
| 5,749,344 | A | | 5/1998 | Yoshiume et al. | |
| 5,797,821 | A | * | 8/1998 | Fujimoto | F16H 61/0437 475/120 |
| 2011/0028273 | A1 | * | 2/2011 | Deishi | F16H 61/0206 477/115 |
| 2013/0049941 | A1 | * | 2/2013 | Otanez | F16H 61/0251 340/438 |
| 2014/0254058 | A1 | | 9/2014 | Suzuki et al. | |

FOREIGN PATENT DOCUMENTS

| JP | 2011-052737 A | 3/2011 |
| JP | 2015-179723 A | 10/2015 |
| JP | 2016-56904 A | 4/2016 |

OTHER PUBLICATIONS

U.S. Appl. No. 15/257,258, filed Jan. 25, 2019, Ibayashi.

* cited by examiner

*Primary Examiner* — Huan Le
(74) *Attorney, Agent, or Firm* — Posz Law Group, PLC

(57) ABSTRACT

An automatic transmission controller includes a solenoid drive controller that performs a current feedback control to one or more of a plurality of solenoids that correspond to a plurality of gear positions for shifting to one of the plurality of gear positions in a transmission mechanism. From among all the solenoids, the solenoid drive controller distinguishes one or more target solenoids to operate to shift from a current gear position to a post-change gear position, and changes a current feedback cycle of the target solenoid(s) for performing the current feedback control.

5 Claims, 15 Drawing Sheets

FIG. 3

| SOLENOID | 11a<br>6a | 11b<br>6b | 11c<br>6c | 11d<br>6d |
|---|---|---|---|---|
| GEAR | C1 | C2 | B1 | B2 |
| 1st | ○ | | | |
| 2nd | ○ | | ○ | |
| 3rd | ○ | | | ○ |
| 4th | ○ | ○ | | |
| 5th | | ○ | | ○ |
| 6th | | ○ | ○ | |

FIG. 8

| SHIFT PATN | DRIVING | DRIVEN | IN-BTWN |
|---|---|---|---|
| 3→2 | 6d(B2) | 6c(B1),6d(B2) | 6c(B1),6d(B2) |
| 3→4 | 6b(C2),6d(B2) | 6d(B2) | 6b(C2),6d(B2) |

AUTOMATIC TRANSMISSION CONTROLLER

CROSS REFERENCE TO RELATED APPLICATION

The present application is based on and claims the benefit of priority of Japanese Patent Application No. 2018-016393, filed on Feb. 1, 2018, the disclosure of which is incorporated herein by reference.

TECHNICAL FIELD

The present disclosure relates to an automatic transmission controller.

BACKGROUND INFORMATION

An automatic transmission controller controls an automatic transmission by controlling an electric current supplied to a linear solenoid valve (referred to simply as a "solenoid") for hydraulic control in order to improve a drive feeling. The controller may use a dither-chopper control to improve responsiveness when performing a current control on a solenoid.

Given an increase in the number of gears in automatic transmissions, more solenoids may have to be added to switch to different gear positions. The control of an increased number of solenoids may cause an increased processing load on the automatic transmission controller. As such, automatic transmission controllers are subject to improvement.

SUMMARY

The present disclosure describes an automatic transmission controller that can reduce a processing load for a gear shift operation of the automatic transmission.

In an aspect of the present disclosure, a current controller performs a feedback control of an electric current (i.e., current feedback control) to a plurality of solenoids respectively corresponding to multiple gears (i.e., gear positions), for shifting a transmission mechanism to one of the multiple gears (i.e., to one of multiple gear positions).

BRIEF DESCRIPTION OF THE DRAWINGS

Objects, features, and advantages of the present disclosure will become more apparent from the following detailed description made with reference to the accompanying drawings, in which:

FIG. 3 is a table illustrating a corresponding relationship between a shift state (i.e., a gear position) and a clutch state;

FIG. 8 is a table illustrating a relationship between (i) an input shaft of a transmission mechanism as a driving body, a driven body, and an in-between body, and (ii) a shift pattern for identifying a target clutch to operate;

DETAILED DESCRIPTION

Figure 1:
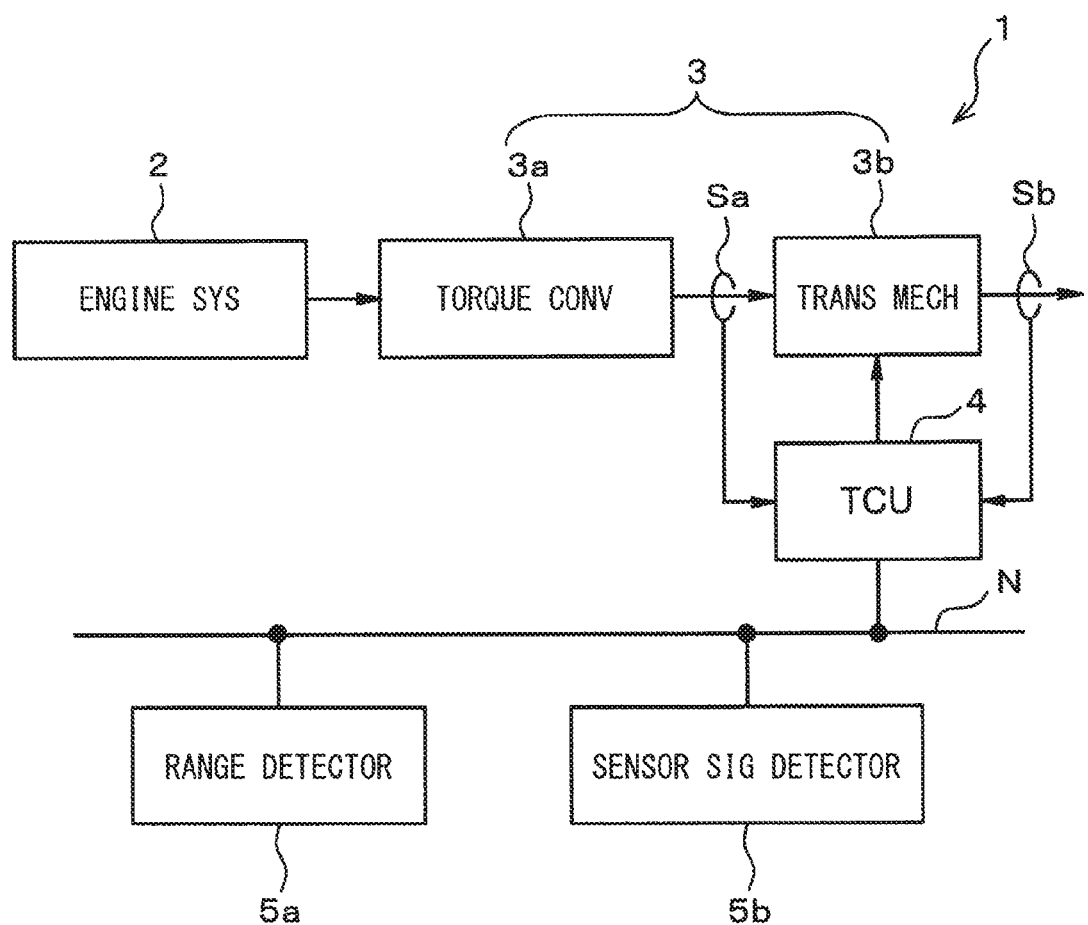
FIG. 1 is a functional block diagram of a part of a vehicle control system in a first embodiment of the present disclosure.

Several embodiments of the automatic transmission controller that is part of the vehicle control system are described below. In the descriptions of the following embodiments, like features, parts, and functions among the different embodiments may be referred to by the same reference numerals, and repeat descriptions of the like features, parts, and functions that have been already described may be omitted from the descriptions of the latter embodiments.

In recent years, since the number of gears in an automatic transmission have increased (i.e., an increase in the number of gear position), the number of solenoids for shifting to different gears has also increased. The increased number of gears and solenoids has led to demands for improving the responsiveness in supplying an electric current for controlling the increased amount of solenoids. Responsiveness may be improved by shortening the feedback cycle of the electric current applied to the solenoid by the controller as much as possible. However, if the feedback cycle of the electric current is shortened for all the solenoids, the processing load of the controller increases. Considering such circumstances, a microcomputer with high processing performance for handling a higher processing load may be needed in order to control the increased number of solenoids with a short current feedback cycle. In such cases, the high cost of such high performance controllers capable of such processing loads may make the manufacturing of such a controller for use in vehicles impractical or unfeasible.

First Embodiment

FIGS. 1 to 11 illustrate the first embodiment of the present disclosure. FIG. 1 shows a part of a vehicle control system 1. As shown in FIG. 1, as main components, the vehicle control system 1 includes an engine system 2 as a prime source of propulsion force and an automatic transmission 3 for transmitting a rotational drive torque of an output shaft of the engine system 2 to wheels (not shown). The automatic transmission 3 includes a torque converter 3a and a transmission mechanism 3b. The automatic transmission 3 is connected to a Transmission Control Unit (TCU) 4. The TCU 4 may be connected to a range detector 5a and a sensor signal detector 5b through an in-vehicle network N. The TCU 4 is connected to an input rotation number sensor Sa for detecting a number of rotations of an input rotation shaft between the torque converter 3a and the transmission mechanism 3b. The TCU 4 also includes an output rotation number sensor Sb for detecting a number of rotations and a rotation torque of an output rotation shaft of the automatic transmission 3. The rotation numbers sensed by input rotation number sensor Sa and the output rotation number sensor Sb may be referred to collectively as "S" for input into the TCU 4.

The engine system 2 controls an electronic throttle valve based on an operating amount of an accelerator by a driver in an electronically-controlled throttle system (not shown). That is, the engine system 2 controls an intake air amount of the engine and controls a rotational driving force of the engine output shaft. The engine system 2 is, for example, an internal combustion engine such as a gasoline engine or a diesel engine. The rotational driving force of the output shaft of the engine system 2 is transmitted to an input shaft of the automatic transmission 3. The torque converter 3a transmits the rotational driving force of the output shaft of the engine system 2 to the input shaft of the transmission mechanism 3b via a hydraulic fluid (not shown).

Figure 2:
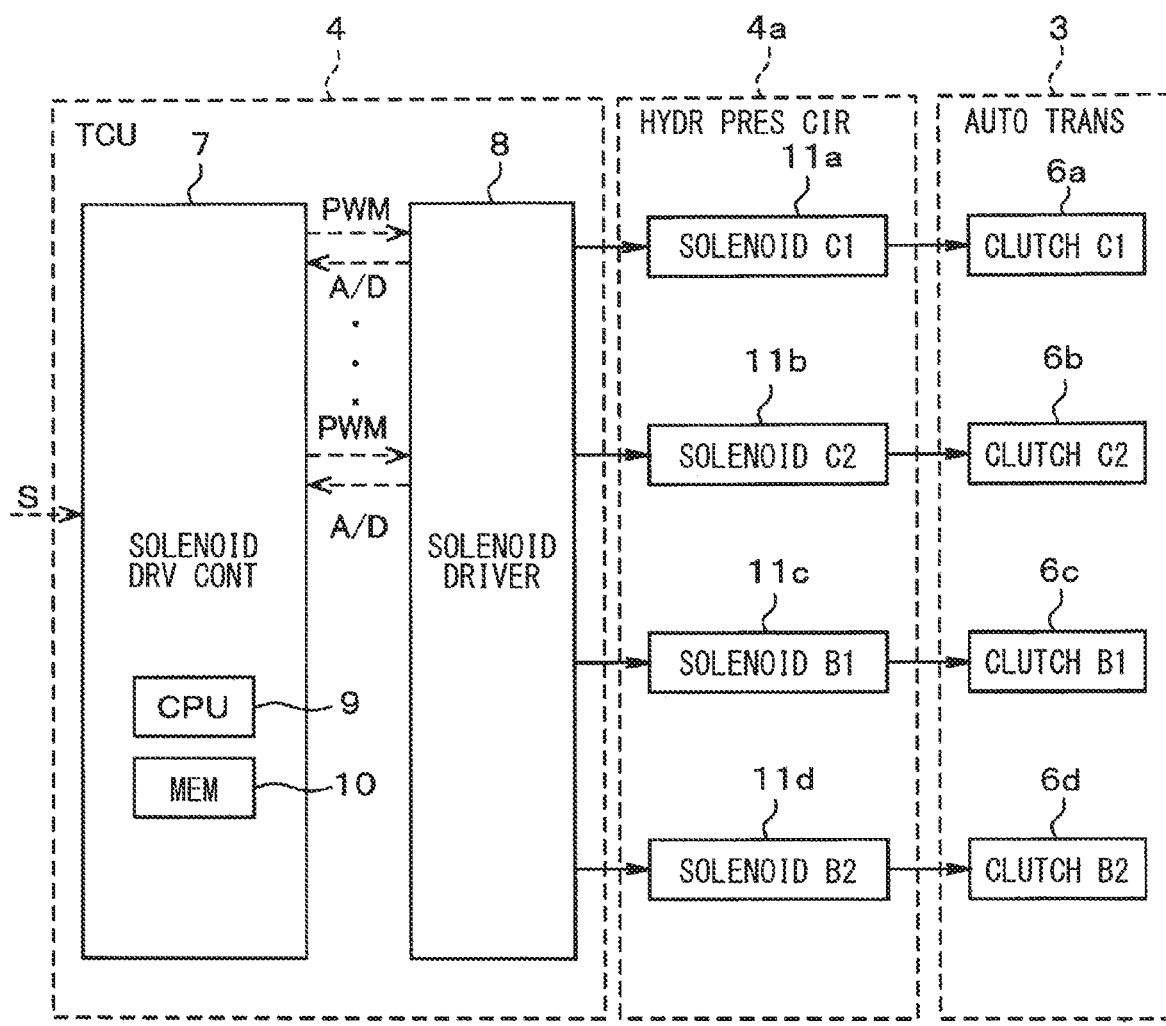
FIG. 2 is a block diagram of an electrical configuration for operating an automatic transmission.

The transmission mechanism 3b includes a plurality of gears using a planetary gear for switching a gear ratio between the input shaft and the output shaft, and a plurality of clutches 6a to 6d connected to the respective gears, as shown in FIG. 2. FIG. 2 also illustrates a hydraulic circuit 4a that controls the engagement/disengagement state (i.e., release) of the clutches 6a to 6d for switching the gear ratio of the input and output shafts.

The range detector 5a shown in FIG. 1 detects, for example, a range corresponding to a position of a shift lever operated by the driver, and outputs the detected operation state information to the network N. In an automatic transmission vehicle having a manual shift mode or an M mode (i.e., manumatic), the positions of the shift level may be a P range indicating parking, an R range indicating reverse, an N range indicating neutral, a D range indicating drive, as well as "+" and "−" positions in the M mode/manual operating mode (e.g., upshifting and downshifting positions). The TCU 4 receives an input of the information on the detected range from the range detector 5a through the network N.

The sensor signal detector 5b detects various sensor signals such as an accelerator opening degree signal from an accelerator opening degree sensor that changes based on the opening degree of the accelerator, for example, when the driver depresses the accelerator. The sensor signal detector 5b may also detect a throttle opening degree signal from a throttle opening degree sensor, as well as detecting other sensor signals. The sensor signal detector 5b may detect the sensor signals as an in-vehicle state of the vehicle, and outputs the sensor signals to the network N. The "accelerator opening degree" may also be described more simply as the "accelerator opening." While the sensor signal 5b is described in the singular for ease of understanding, the sensor signal detector 5b may represent one or more electronic control units (ECUs) that either collectively or individually receive the inputs of various sensor signals. The TCU 4 can receive an input of the in-vehicle state of the vehicle by acquiring those sensor signals through the network N.

As shown in FIG. 2, the TCU 4 includes a solenoid drive controller 7 and a solenoid driver 8. The solenoid drive controller may be referred to simply as the "controller" 7. The controller 7 includes one or more microcomputers including a CPU 9 and a memory 10 such as a RAM, a ROM, a flash memory, as its main components. The memory 10 is a non-transitory, substantive storage medium that stores an M-mode shift line and a D-range shift line. The controller 7 realizes various functions by executing a program stored in the memory 10 by the CPU 9. For example, depending on the function performed by the controller 7, the controller 7 may function as a current controller, a distinguisher, and an input section. The functions of the controller 7 may be described in greater detail below relative to processes illustrated in the flowcharts. The controller 7 can calculate a current vehicle speed by using the sensor signals from the rotation number sensors Sa and Sb and/or the sensor signal(s) of the sensor signal detector 5b. The controller 7 can also calculate an acceleration from the time change of the vehicle speed (e.g., as a time derivative).

Based on the detection result of the range detected by the range detector 5a, in the M mode (i.e., in a manual shift mode), the TCU 4 sequentially increases (i.e., upshifts) the gear position of the transmission mechanism 3b upon receiving an instruction of "+" (e.g., as an input from the shift lever) and sequentially decreases (i.e., downshifts) the gear position of the transmission mechanism 3b upon receiving an instruction of "−" (e.g., as an input from the shift lever). In the D range (i.e., the drive range in the automatic shift range), the TCU 4 uses the D-range shift line stored in the memory 10 to switch from the 1st range to 6th range either sequentially step-by-step (e.g. gear-by-gear from 1st gear to 2nd gear, 2nd gear to 3rd gear, etc.) or by jumping two more of more gears per shift operation (e.g., 1st gear to third gear).

As shown in FIG. 2, the controller 7 of the TCU 4 outputs a pulse width modulation (PWM) signal to the solenoid driver 8 for driving each of the clutches 6a to 6d. The controller 7 also hydraulically controls an operation of a plunger via linear solenoid valves (referred to simply as "solenoids") 11a to 11d provided in the hydraulic circuit 4a, for controlling engagement/disengagement states of the respective clutches 6a to 6d. The solenoids 11a to 11d are spool type hydraulic control valves used for pressure control of the hydraulic fluid supplied to a hydraulic actuator of the automatic transmission 3.

<Relationship Between the Engagement/Disengagement State of the Clutches and the Gear Position of the Automatic Transmission>

The relationship between the engagement/disengagement state of the clutches 6a to 6d and the gear position of the automatic transmission 3 is described with reference to FIG. 3. FIG. 3 shows a correspondence table of the engagement/disengagement state of the clutches 6a to 6d and the gear position of the automatic transmission 3 and the corresponding solenoids 11a to 11b used to control the clutches 6a to 6d. In FIG. 3, 1st, 2nd, 3rd, 4th, 5th and 6th respectively indicate a forward gear position (e.g., from lowest gear to highest gear), and a "circle" in the box indicates an engagement state of each clutch, while no sign (i.e., the absence of a circle) indicates a disengaged state, that is, a release state of the clutch.

The TCU 4 realizes different combinations of engagement and release states of the clutches 6a to 6d corresponding to the requested gear position from among the multiple gear positions of the automatic transmission 3 when the requested gear position is detected by the range detector 5a.

For example, when the range detector 5a detects the D range and such information is transmitted to the TCU 4, the TCU 4 sequentially switches gear positions from 1st to 6th.

In such case, when shifting to 3rd gear, the TCU 4 switches the engagement/release state of the clutches 6a to 6d corresponding to the forward 3rd position, and, in such 3rd range, the clutch 6a (C1) and 6d (B2) are brought into the engagement state, and the clutches 6b (C2) and 6c (B1) are put in the release state.

For example, with respect to the engaged clutches 6a and 6d in 3rd gear (i.e., the 3rd range or the 3rd position), the controller 7 sets a standard current value of the direct current applied to the solenoids 11a and 11d that correspond to the engaged clutches 6a (C1) and 6d (B2) to a high value Ihi. For example, Ihi may be the maximum value Imax of a direct current (DC) control range that serves as a target current. The controller 7 may apply a PWM current respectively to the solenoids 11a and 11d in an overlapping manner over the standard, high value Ihi for the two solenoids 11a and 11d in accordance with an output of a PWM signal. The controller 7 detects the supplied current of the solenoids 11a and 11d by using an A/D converter (not shown), and controls an amplitude of the PWM current to match the detected current to the target current. In such manner, the current feedback control is performed. A dither-chopper control may be performed in such current feedback control. The dither-chopper control is performed, in addition to setting a fine-tuned (e.g., short) control pulse cycle for realizing a constant target current value. The dither-chopper control is performed (i) by setting a target current value that changes cyclically and in a stepwise-manner at a cycle longer than the fine-tuned control pulse cycle, and (ii) by performing a current feedback control of the PWM current based on the target current value.

With respect to the disengaged clutches 6b and 6c in the above 3rd gear example, the controller 7 sets the applied direct current to a low value Ilo as the target current to the solenoids 11b and 11c corresponding to the clutches 6b and 6c to be released. Ilo, for example, may be the minimum value Imin of the direct current control range. The controller 7 applies the PWM current corresponding to the PWM signal to be output to the solenoids 11b and 11c in an overlapping manner over the low value Ilo. The current of the solenoid is detected by the A/D converter (not shown), and the amplitude of the PWM current is controlled to match the detected current to the target current. In such manner, the current feedback control is performed. The controller 7 outputs the PWM signal to the solenoid driver 8, and the solenoid driver 8 performs the current feedback control for the solenoids 11a to 11d, thereby matching the control current to the target current value. As a result, an accurate hydraulic control can be performed. Although the control for 3rd gear has been described in the preceding examples, the current feedback control for the other gears is performed in a similar manner.

<Method of Switching the Current Feedback Cycle>

In the present embodiment, the controller 7 can adjustably control the cycle of the PWM signal for the current feedback control of the solenoids 11a to 11d. For example, when the controller 7 shortens the current feedback cycle of the PWM current applied to the solenoids 11a to 11d, it is possible to improve the responsiveness of the control to the solenoids 11a to 11d. As a result, the responsiveness in the control for switching between the engagement/release state of the clutches 6a to 6d can be increased, the gear-shifting is performed more quickly, and the drive feeling for the driver is improved.

When responsiveness of the control for all of the solenoids 11a to 11d is uniformly increased, the processing load of the CPU 9 in the controller 7 may significantly increase. Therefore, in order to reduce the processing load of the CPU 9, each of the solenoids is distinctively set either as a target solenoid or a non-target solenoid in the current feedback control.

The details of how to switch the current feedback cycle is described with reference to FIGS. 4 and 5.

The controller 7 determines the operation state of the driver or more simply the operation state. The operation state may refer to an operation performed by the driver (e.g., a driver input). The controller 7 also determines the in-vehicle state of the vehicle based on the various sensor signals detected by the range detector 5a, the rotation number sensors Sa and Sb, and the sensor signal detector 5b. That is, the in-vehicle state may refer to the vehicle state on the basis of what is being detected by the various sensors 5a, Sa, Sb, 5b. The controller 7 may use the operation state (of the driver) (e.g., driver inputs) and the in-vehicle state (of the vehicle) (e.g., sensor data) to predict a gear shift position. That is, the controller 7 may use the operation state and in-vehicle state to determine or predict a next gear position based on the current gear position. The controller 7 may use the operation state and in-vehicle state with the current gear position (i.e., a pre-change gear position) to determine/predict the next gear position (i.e., post-change gear position) after the current gear position in the automatic transmission 3 is shifted to the next gear position.

Figure 4:
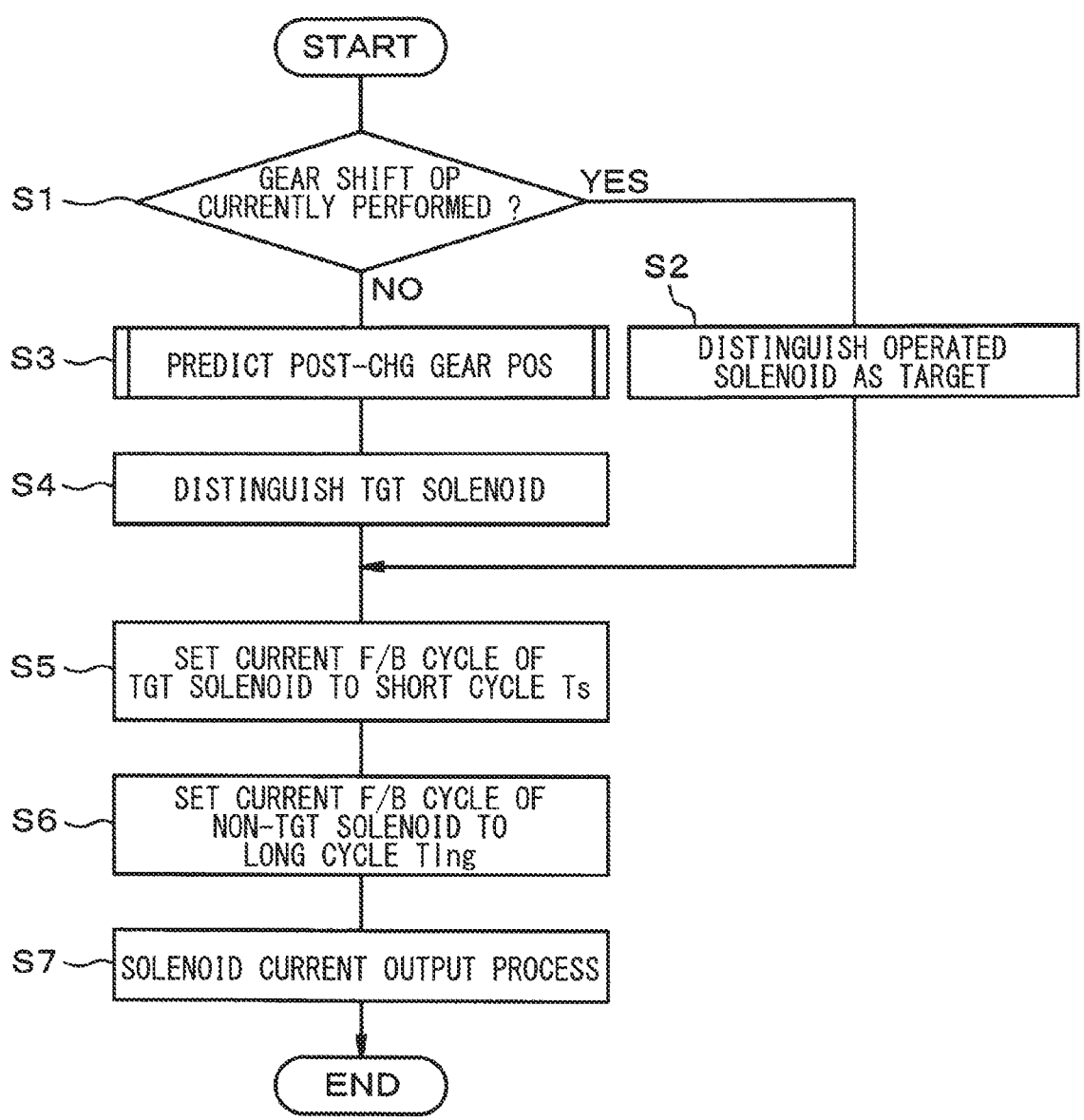
FIG. 4 is a flowchart of part of a control process.

With reference to FIG. 4, at S1, on the basis of determining the operation state and the in-vehicle state, the controller 7 determines whether or not a gear shift operation, that is, a gear change from one gear position to another is currently performed. When it is determined that the gear shift operation is currently performed, i.e., "YES" at S1, the process proceeds to S2 and the controller 7 distinguishes the target solenoid or solenoids that is/are currently operated in the gear shift operation, and the non-target solenoids that are not operated in the gear shift operation. For example, when the controller 7 changes the gear position from 3rd to 4th, as shown in the correspondence table of FIG. 3, the solenoids 11b and 11d currently operated are respectively set as a target solenoid, and the solenoids 11a and 11c that are not currently operated are respectively set as a non-target solenoid. Here, 3rd gear, may be referred to as the pre-change position while 4th gear may be referred to as the post-change position. Because the solenoid 11b is operated to engage the clutch 6b when shifting from 3rd gear to 4th gear, the solenoid 11b is set as a target solenoid. Likewise, because the solenoid 11d is operated to disengage the clutch 6d when shifting from 3rd gear to 4th gear, the solenoid 11d is set as a target solenoid.

Returning to S1, when the controller 7 determines at S1 that the gear shift operation is not currently performed, i.e., "NO" at S1, the process proceeds to S3. At S3, the controller 7 predicts the post-change gear position and the process proceeds to S4. At S4, the controller 7 distinguishes the target solenoids corresponding to the post-change gear position from the non-target solenoids.

When the controller 7 performs the processes at S3 and S4 the controller performs a distinguishing function to distinguish the target solenoids from the non-target solenoids. As such, the controller 7 may be referred to as a "distinguisher" when performing the processes at S3 and S4.

At S5, the controller 7 sets the current feedback cycle for driving the target solenoid to a relatively short cycle Ts. At S6, the controller 7 sets the current feedback cycle for driving the non-target solenoid to a relatively long cycle Tlng. At S7, the controller 7 performs the current output process to output the electric current to each of the solenoids 11a to 11d.

When the controller 7 performs the processes at S5, S6, and S7, the controller performs a current controlling function to set the current feedback cycles for the target and non-target solenoids and output the electric current to each of the solenoids 11a to 11d. As such, the controller 7 may be referred to as a "current controller" when performing the processes at S5, S6, and S7.

Here, the controller 7 determines the short cycle Ts at S5 based on the characteristics of the solenoids 11a to 11d, and sets the cycle to a predetermined cycle (e.g., 5 msec) that maximizes the responsiveness of the control of the solenoids 11a to 11d. The controller 7 also determines the long cycle Tlng at S6 as a predetermined cycle (e.g., 10 msec) (i) to keep the hydraulic pulsation within an allowable range when adjusting the hydraulic pressure by the hydraulic circuit 4a, and (ii) so as to not negatively influence the processing load of the CPU 9 in the controller 7.

Figure 5:
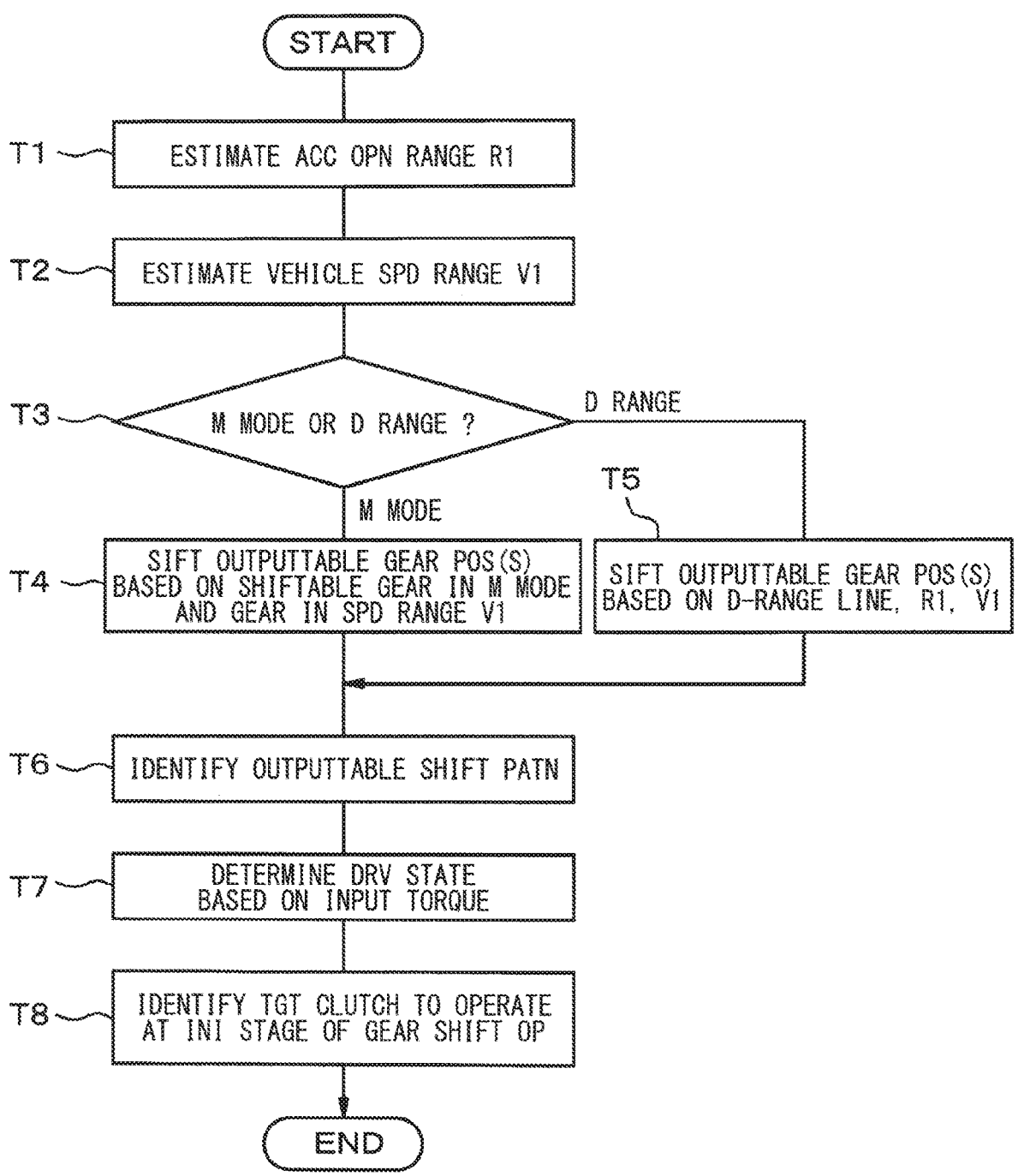
FIG. 5 is a flowchart of another part of the control process shown in FIG. 4.
Figure 6:
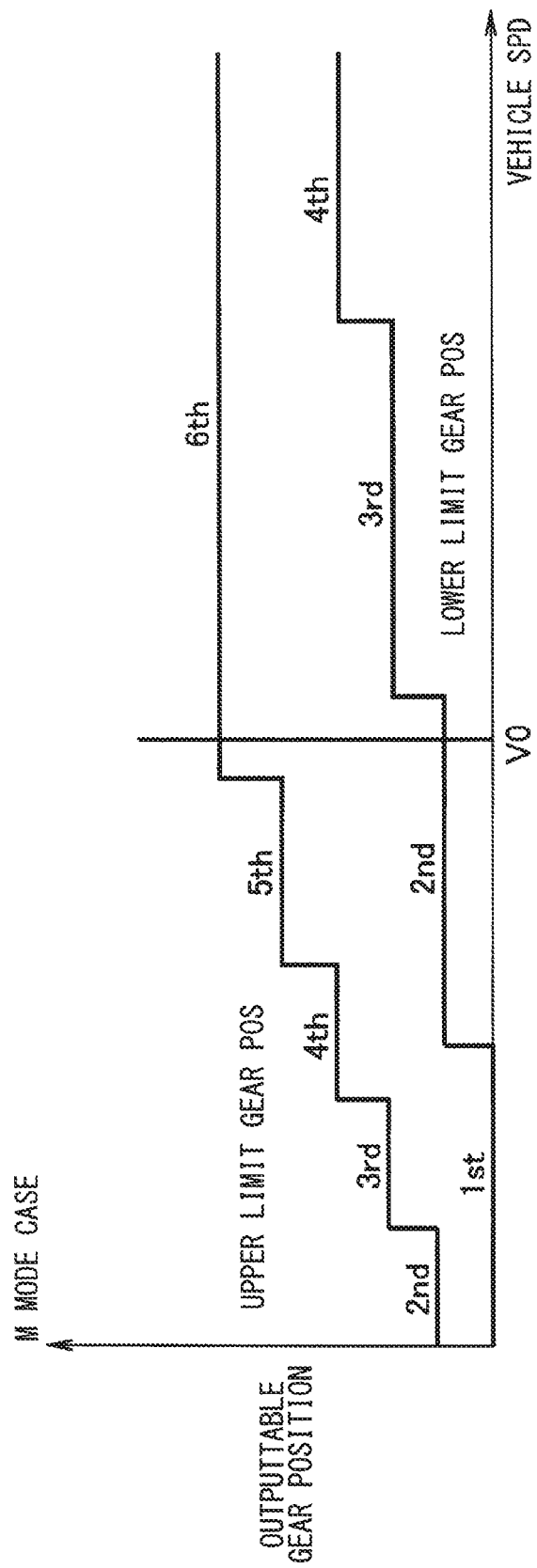
FIG. 6 illustrates a relationship between outputtable gear positions and a vehicle speed in an M mode.

With reference to FIG. 5, the prediction process of the post-change gear position at S3 is described. At T1, the controller 7 estimates an accelerator opening range R1 that can be reached within a predetermined time based on the current accelerator opening degree detected by the sensor signal detector 5b. The following description is based on, i.e., uses, the accelerator opening range R1. However, as the accelerator opening increases, an electronic throttle opening also increases linearly in proportion to the accelerator opening. As such, the estimation of the opening range may be based either on the accelerator opening or the electronic throttle opening. The estimated opening range may be determined by assuming how far the accelerator opening will increase within a predetermined time from when the accelerator pedal is depressed by the driver at a current time. At T2, the controller 7 estimates a vehicle speed range V1 that can be reached within a predetermined time from the current time based on the current vehicle speed information and acceleration information detected by the sensor signal detector 5b.

At T3, the controller 7 determines whether the transmission mechanism 3b is currently in the D range or in the M mode. When the controller 7 determines that the transmission mechanism 3b is in the M mode, the process proceeds to T4 and the controller 7 determines a gear position or positions that can be output by sifting or narrowing all available gear positions of the transmission mechanism 3b based on (i) shiftable gear positions that can be shifted to by the gear shift operation from the current gear position, and (ii) gear positions that can be output based on the current vehicle speed range V1. For example, with reference to FIG. 6, when the current vehicle speed is V0, the controller 7 determines from the M-mode shift line that is stored in the memory 10 that the outputtable gear positions are gear positions between the 2nd and 6th gears. That is, the outputtable gear positions include both the 2nd and 6th gear and all the gears in between the 2nd and 6th gears. The M-mode shift line shows the relationship of the outputtable gear positions (that is, an upper limit gear position and a lower limit gear position) relative to the vehicle speed.

Alternatively, returning to T3, when the controller 7 determines that the transmission mechanism 3b is in the D range according to the range detector 5a, the process proceeds to T5. At T5, the controller 7 sifts (i.e., narrows) the outputtable gear position to one or more positions based on the D-range shift line shown in FIG. 7, the accelerator opening range R1, and the vehicle speed range V1.

When the controller 7 performs the processes at T1, T2, T3, T4, and T5, the controller performs an input function to input the operation state (of the driver) and the in-vehicle state (of the vehicle). As such, the controller 7 may be referred to as an "input section" when performing the processes at T1, T2, T3, T4, and T5.

Figure 7:
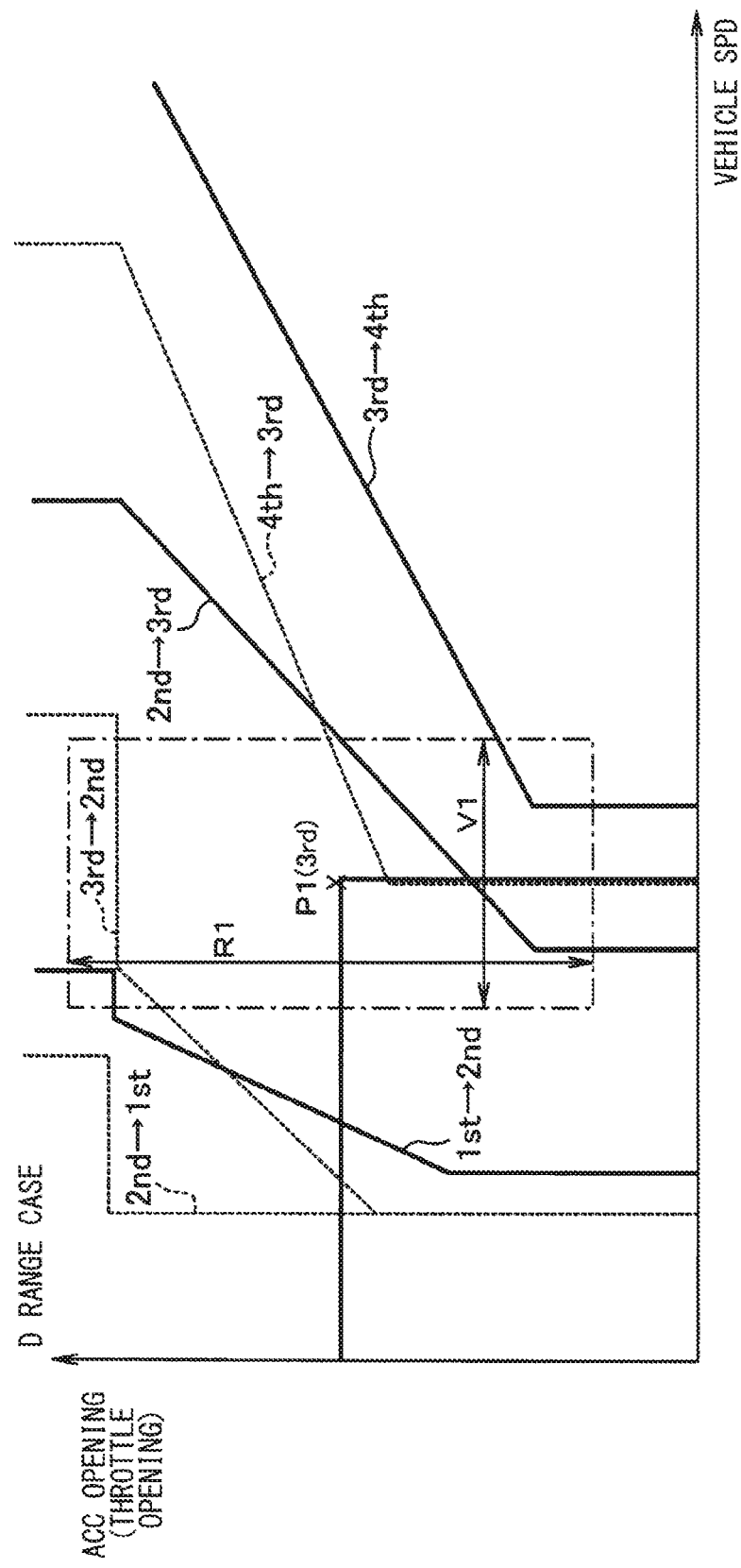
FIG. 7 illustrates a relationship between the vehicle speed and the outputtable gear positions for a D range shift line.

As shown in FIG. 7, the D-range shift line is stored in the memory 10. Relationships between the vehicle speed and the accelerator opening (or the electronic throttle opening) for upshifting (e.g., 1st gear to 2nd gear, 2nd gear to 3rd gear, and 3rd gear to 4th gear) and for downshifting (e.g., 2nd gear to 1st gear, 3rd gear to 2nd gear, and 4th gear to 3rd gear) may be stored to the memory 10 in advance.

With reference to FIG. 7, when the controller 7 detects the relationship between the current vehicle speed and the current accelerator opening, for example, at point P1 for 3rd gear, the controller 7 defines the vehicle speed range V1 along a horizontal axis and the accelerator opening range R1 along a vertical axis. Both the vehicle speed range V1 and the accelerator opening range R1 are used to determine a rectangular area, shown by a one-dash-one-dot line centered about the point P1, where the rectangular area shown in FIG. 7 overlaps portions of the D-range shift lines. By defining such a rectangular area, it is possible to predict a gear position that can be output in the future. At T6, the controller 7 identifies a shift pattern that can actually be output based on the gear position or positions s identified by the sifting process as possible output gear(s) in T5.

For example, assuming that the current gear position is 3rd gear and that the rectangular area is defined by the vehicle speed range V1 and the accelerator opening range R1, as shown in FIG. 7, this area overlaps portions of the D-range shift lines where the transmission is downshifted from 3rd gear to 2nd gear (i.e., 3rd→2nd) and upshifted from 3rd gear to 4th gear (i.e., 3rd→4th). The controller 7 predicts that the outputtable gear positions are 2nd gear and 4th gear, and identifies the outputtable shift pattern as 3rd gear to 2nd gear (i.e., "3rd→2nd") and 3rd gear to 4th gear (i.e., "3rd→4th").

Returning again to FIG. 3, upon predicting that the outputtable gear positions are 2nd gear and 4th gear, the controller 7 identifies that the clutch 6c (B1) needs to be engaged (i.e., transition from released→engaged) and that the clutch 6d (B2) needs to be disengaged/released (i.e., transition from engaged→released) to perform the shift operation for the shift patter 3rd gear to 2nd gear (i.e., "3rd→2nd").

The controller 7 also identifies for the gear shift operation of the shift pattern 3rd→4th, that the clutch 6b (C2) needs to be engaged (i.e., transition from released→engaged) and that the clutch 6d (B2) needs to be released (i.e., transition from engaged→released). As such, when an upshift/downshift operation is performed from the 3rd gear, the clutches 6b, 6c, 6d are identified as clutches that could be operated during the upshift/downshift operations. That is, the controller 7 identifies the clutches 6b, 6c, and 6d as the target clutches.

In such a case, at T7, the controller 7 may detect a current input of a turbine torque related to the input shaft of the transmission mechanism 3b, and, based on such a torque detection, the controller 7 may determine whether the input shaft of the transmission mechanism 3b serves as a driving body, a driven body, or an in-between body (shown as "DRIVING," "DRIVEN," and "IN-BTWN" in FIG. 8). At T8, the controller 7 may identify a target clutch to operate at the beginning of the gear shift operation (shown as "AT INI(TIAL) STAGE OF GEAR SHIFT OP(ERATION)" in FIG. 5). The processes of T7 and T8 may be omitted. That is, without considering the input turbine torque of the input shaft of the transmission mechanism 3b, the processes from T1 to T6 in FIG. 5 may be used to distinguish a target solenoid at S4 in FIG. 4.

The processes at T7 and T8 are described with reference to FIG. 8. The correspondence table shown in FIG. 8 is stored in advance in a non-volatile memory 10. For example, the correspondence table in FIG. 8 may be stored to the non-volatile memory 10 during the manufacture of the controller 7 so that the correspondence table is preloaded and stored to the memory 10 of the controller 7 before the controller 7 leaves its place of manufacture.

"Driving" and "Driven" in FIG. 8 indicate a relation of whether the input shaft of the transmission mechanism 3b serves as a driving body or a driven body, in a slip-engagement situation of components between the engine system 2 and the transmission mechanism 3b. That is, "driving" and "driven" may refer to the engagement of components between the engine system 2 and the transmission mechanism 3b. Slip-engagement may refer to a smooth transitional engagement between the engine system 2 and the transmission mechanism 3b.

"Driving" may be a condition where the rotation number of the output shaft of the engine system 2 is increasing which in turn increases the turbine rotation number of the input shaft of the transmission mechanism 3b. In other words, "driving" may refer to conditions that require that the input torque of the transmission mechanism 3b is higher than a predetermined range. Such a condition is satisfied when, for example, the accelerator opening degree is greater than an upper limit value of the predetermined range. Such conditions may be referred to simply as "driving."

"Driven" in FIG. 8 may be a condition where the rotation number of the output shaft of the engine system 2 is decreasing, which in turn causes the turbine rotation number of the input shaft of the transmission mechanism 3b to decrease. In other words, "driven" may refer to conditions that require that the input torque of the transmission mechanism 3b is lower than the predetermined range. Such a condition is satisfied when, for example, the accelerator opening degree is lower than the lower limit value of the predetermined range. Such conditions may be referred to simply as "driven."

"In-between" describes an intermediate range where the input torque of the transmission mechanism 3b is within the predetermined range.

<"Driving"—Downshifting from 3rd Gear to 2nd Gear when the Input Shaft of the Transmission Mechanism is a Driving Body>

In the vehicle control system 1, when the automatic transmission 3 is downshifting from 3rd gear to 2nd gear (i.e., 3rd→2nd), the turbine rotation number of the input shaft of the transmission mechanism 3b increases. Based on such a rise of the turbine rotation number of the input shaft, the transmission mechanism 3b can be promptly driven by receiving an external assistance, and a control speed, that is, the controllability, of the hydraulic control by the controller 7 may be lowered voluntarily. As such, as shown in FIG. 8 for the "driving," when the input torque of the transmission mechanism 3b is higher than the predetermined range, the controller 7 may select only the clutch 6d (B2) to transition from be engaged to being released (i.e., disengaged) for the downshift from 3rd gear to 2nd gear (i.e., 3rd→2nd) as a target clutch 6d (B2) to operate during a shift output prediction period Tm1. The shift output prediction period Tm1 occurs at the beginning of the gear shift operation and is described in greater detail below with reference to FIG. 9.

Then, the controller 7 returns to the process at S4 in FIG. 4, distinguishes only the solenoid 11d corresponding to the target clutch 6d (B2) as a target solenoid, and distinguishes the other solenoids 11a to 11c as the non-target solenoids.

Thereafter, as shown at S5 to S7 in FIG. 4, the controller 7 sets only the current feedback cycle of the target solenoid 11d to the short cycle Ts, and sets the current feedback cycle of the other, non-target solenoids 11a to 11c to the long cycle Tlng. In such a way, the responsiveness of the control can be set to an appropriate state.

<"Driven"—Downshifting from 3rd Gear to 2nd Gear when the Input Shaft of the Transmission Mechanism is a Driven Body>

Conversely, when the input torque of the transmission mechanism 3b is lower than the predetermined range, the control speed, that is, the controllability, is inferior to the controllability when the input shaft of the transmission mechanism 3b is driven from the engine system 2 side. Therefore, both of the clutches 6c, 6d (B1, B2) to be engaged/released may be distinguished as a target clutch to operate during the shift output prediction period Tm1 at the beginning of gear shift operation. The controller 7 then returns the to the process at S4 in FIG. 4, distinguishes the solenoids 11c, 11 d (B1, B2) corresponding to the target clutches 6c, 6d as the target solenoids, and distinguishes the other solenoids 11a, 11b as the non-target solenoids. Then, as shown at S5 to S7 in FIG. 4, the controller 7 sets the current feedback cycle of the target solenoids 11c, 11d to the short cycle Ts. In such manner, the responsiveness of the control can be set to an appropriate state.

<"In-Between"—Downshifting from 3rd Gear to 2nd Gear for an in-Between Condition>

The controller 7 sets the clutches 6c (B1) and 6d (B2) respectively as a target clutch for an in-between condition, that is, for an intermediate condition in between the "Driving" and "Driven" conditions. In such manner, by setting the current feedback cycle of the target solenoids 11c (B1), 11d (B2) corresponding to the target clutches 6c (B1), 6d (B2) to the short cycle Ts, the responsiveness of the control can be set to an appropriate state/level.

<"Driving"—Upshifting from 3rd Gear to 4th Gear when the Input Shaft of the Transmission Mechanism is a Driving Body>

When the automatic transmission 3 is upshifted, for example from 3rd gear to 4th gear, the turbine rotation number related to the input shaft of the transmission mechanism 3b decreases. As such, the assistance from the external engine system 2 disappears as the turbine rotation number decreases, and it may be preferable for the controller 7 to voluntarily raise the control speed (i.e., the controllability) during the upshift. When the input torque of the automatic transmission 3 is higher than the predetermined range, the controller 7 selects both of the clutches 6b (C2) and 6d (B2) as a target clutch to operate (e.g., to engage, release) during the shift output prediction period Tm1 at the beginning of the gear shift operation.

<"Driven"—Upshifting from 3rd Gear to 4th Gear when the Input Shaft of the Transmission Mechanism is a Driven Body>

When the automatic transmission 3 is upshifted, for example, from 3rd gear to 4th gear, the turbine rotation number of the input shaft of the transmission mechanism 3b decreases. When the input torque of the transmission mechanism 3b is lower than the lower limit value of the predetermined range, the turbine rotation number naturally and inevitably decreases. As such, the controller 7 does not have to voluntarily raise the control speed (i.e., the controllability) during the upshift process. Therefore, the clutch 6d (B2) released in the shift process is set as the target clutch to operate during the shift output prediction period Tm1 at the beginning of the gear shift operation.

<"In-Between"—Upshifting from 3rd Gear to 4th Gear for an in-Between Condition>

As shown in FIG. 8, since the clutches 6b (C2) and 6d (B2) are respectively selected as a target clutch for the in-between condition, the controller 7 can set the current feedback cycle of the solenoids 11b, 11d corresponding to these target clutches 6b and 6d to the short cycle Ts, for realizing a control responsiveness at an appropriate state/level.

Example Operation

Figure 9:
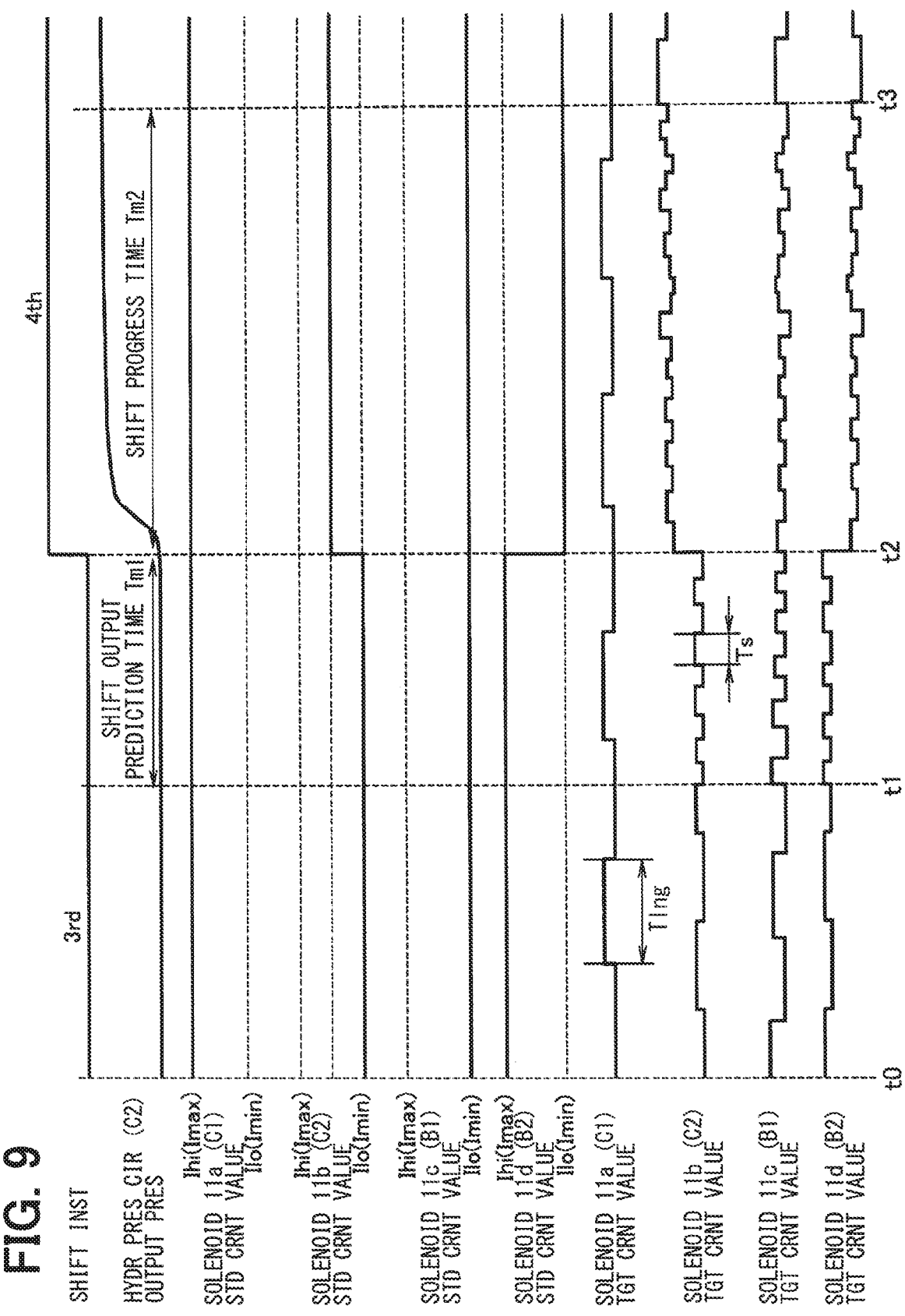
FIG. 9 is a timing chart of an example operation.

FIG. 9 is a time chart showing an example before and after an input of a gear shift instruction for a shift pattern from 3rd gear to 4th gear for shifting the gear position of the automatic transmission 3. In the example of FIG. 9, regardless of the state of the input torque related to the input shaft of the transmission mechanism 3b, the target solenoid(s) that are operated and the non-target solenoid(s) that are not operated are distinguished from each other when there is a possibility that the gear position will be changed. That is, in the present example, although the processes at T1 to T6 in FIG. 5 are going to be performed, the target solenoid and the non-target solenoid are distinguished for an appropriate control of relevant solenoid(s), without performing the processes at T7 and T8.

As shown in FIG. 9, there is a static state between t0 to t1 in which the gear position of the automatic transmission 3 is controlled to stay at 3rd, during which the controller 7 sets a direct current (DC) component of the target current values of the solenoids 11a to 11d respectively to the high value Ihi, the low value Ilo, the low value Ilo, and the high value Ihi and performs a current feedback control by supplying the PWM current on the direct current (DC) component in an overlapping manner. During this period between t0 to t1, the controller 7 performs a current feedback control of each of the solenoids 11a to 11d with the long cycle Tlng.

The controller 7, while performing the process shown in FIG. 4, sets or selects the post-change gear position as 2nd or 4th based on the prediction result at S3. For example, the controller 7 may identify the solenoids 11b (C2), 11c (B1), and 11d(B2) respectively as a target solenoid. The controller 7 may then set the current feedback cycle of the target solenoids 11b (C2), 11c (B1), and 11d(B2) to the short cycle Ts during the shift output prediction period Tm1 from time t1 to time t2, that is, prior to the gear shift instruction at time t2. The controller 7 may then set the current feedback cycle of the other, non-target solenoid 11a (C1) to the long cycle Tlng.

Therefore, even if the controller 7 performs the shift control, for example, to upshift from 3rd gear to 4th gear at time t2, where the upshift from 3rd gear to 4th gear and the downshift from 3rd gear to 2nd gear are predicted as possible shift patterns, the responsiveness of the control of each of the solenoids 11b (C2), 11c (B1) and 11d(B2) has already been improved at time t2 on account of the shift pattern predictions. As such, the controller 7 is capable of quickly increasing the supply of the electric current to the solenoid 11b (C2) corresponding to the clutch 6b (C2) to engage the clutch 6b (C2) for the shifting to 4th gear, and the output pressure of the hydraulic actuator operated by the solenoid 11b (C2) can be increased as quickly as possible. Likewise, the controller 7 can also quickly decrease the supply of the electric current to the solenoid 11d (B2) corresponding to the clutch 6d (B2) to release/disengage the clutch 6d (B2) when shifting to 4th gear, and the output pressure of the hydraulic actuator operated by the solenoid 11d (B2) can be decreased as quickly as possible. As a result, it is possible to quickly respond to the upshifting operation of the gear positions from 3rd to 4th and the downshifting operation of the gear positions from 3rd to 2nd in the same manner.

<Comparison Between "Driving" and "Driven">

Figure 10:
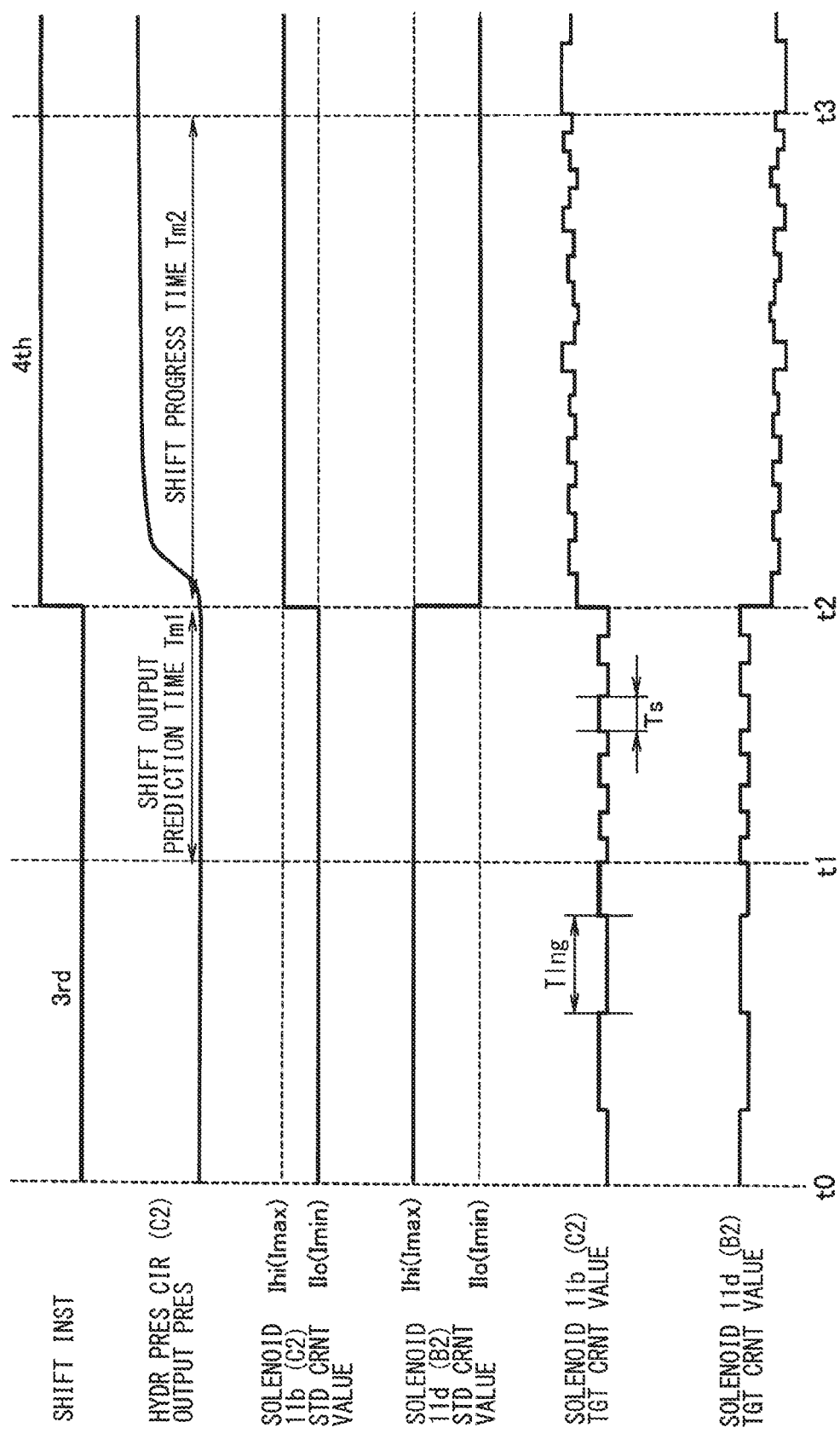
FIG. 10 is a timing chart of a shift flow when the input shaft of the transmission mechanism is the driving body.
Figure 11:
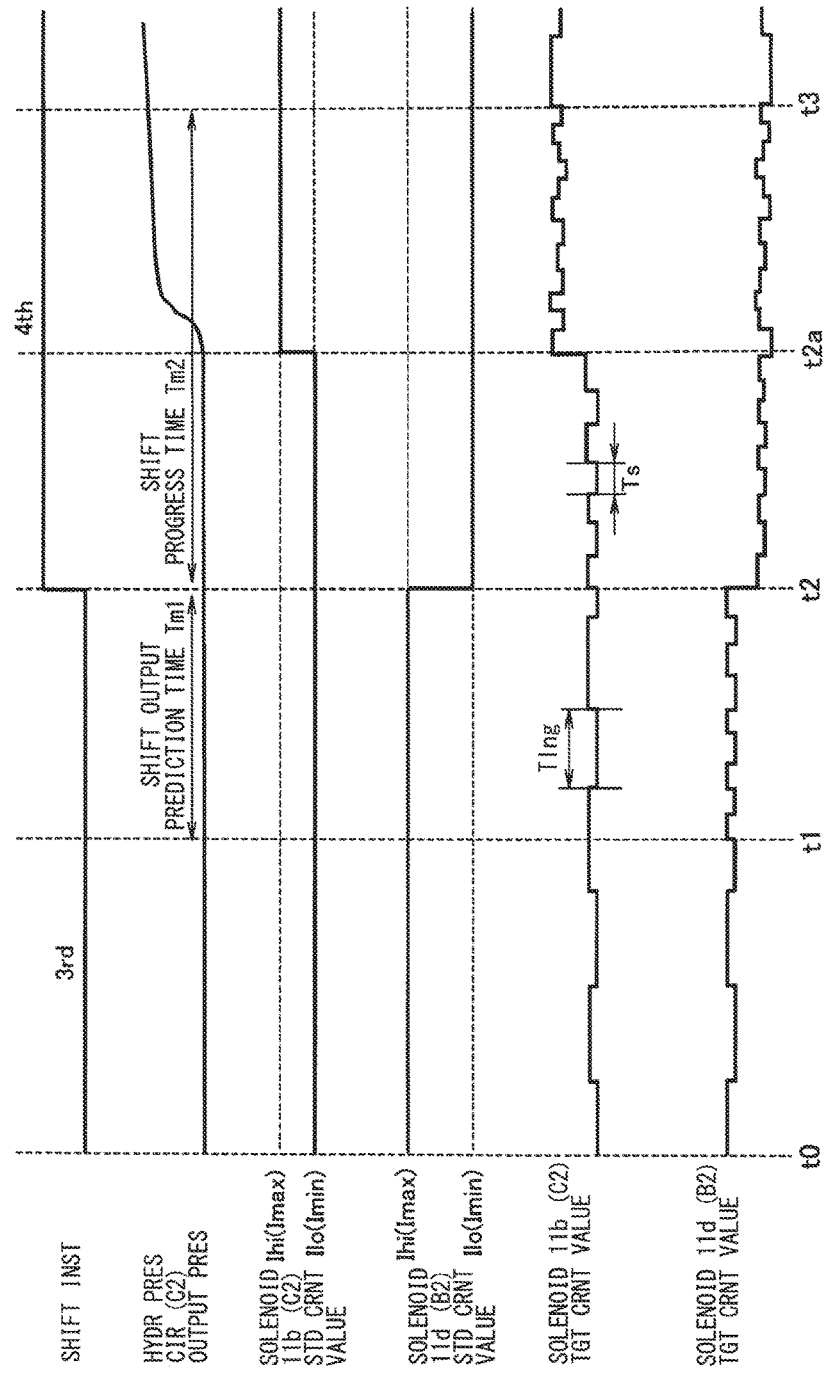
FIG. 11 is a timing chart of a shift flow when the input shaft of the transmission mechanism is the driven body.

FIGS. 10 and 11 respectively show an example in which the target solenoid is identified based on the input torque related to the input shaft of the transmission mechanism 3b. FIGS. 10 and 11 illustrate a comparison of between upshift operation where a "driving" state of the input shaft is shown in FIG. 10 and a "driven" state of the input shaft is shown in FIG. 11. In both the "driving" and "driven" cases shown in FIGS. 10 and 11, the controller 7 performs the processes at T1 to T8 in FIG. 5 to distinguish and control the target solenoid(s) and the non-target solenoid(s).

In the above-described "driving" state, as shown in FIG. 10, the controller 7 sets the short cycle Ts to both of the solenoids 11b (C2) and 11d (B2) during the shift output prediction period Tm1 from time t1 to t2 for performing the current feedback control. As a result, when the upshift instruction is input at time t2, the direct current (DC) component of the target current value of both of the solenoids 11b (C2) and 11d (B2) can be changed substantially simultaneously (i.e., almost at the same time). At this moment, since the controller 7 is performing the current feedback control of the solenoids 11b(C2) and 11d (B2) with the short cycle Ts, it is possible to have a quick control to achieve the target current value.

In the "driven" state shown in FIG. 11, the controller 7 performs the current feedback control only for the solenoid 11d (B2) in the short cycle Ts during the shift output prediction period Tm1 between time t1 and time t2. As such, when a gear shift instruction is received at time t2, after changing the DC component of the target current value of the solenoid 11d (B2) at time t2, the DC component of the target current value of the solenoid 11b (C2) is subsequently changed at time t2a.

At such time, upon receiving the gear shift instruction and entering a shift progress period Tm2 from time t2 to time t3, the controller 7 determines that a gear shift operation is currently being performed, i.e., "YES" at S1 of FIG. 4, distinguishes and sets the solenoids 11b (C2) and 11d (B2) respectively as a target solenoid, and switches the current feedback cycle of the solenoid 11b (C2) to the short cycle Ts at time t2. In such manner, the target current value can be quickly achieved at time t2a after time t2.

As described above, according to the present embodiment, the controller 7 distinguishingly selects the target solenoids (e.g., 11b to 11d) and the non-target solenoid(s) (e.g., 11a) to operate when there is a possibility that the gear position may be changed, or when the gear position is currently changed. The controller 7 then sets respectively different current feedback cycles to the target solenoids and to the non-target solenoid(s). Therefore, the control speed (i.e., the controllability) at the time of performing the shift process can be set differently for the target solenoids and non-target solenoids, and the control speed (i.e., the controllability) of the solenoids that could potentially be used (i.e., the "could-be-used solenoids") during the shift operation (e.g., 11b to 11d) can be raised in advance before the gear shift instruction is input during the period Tm1.

The "could-be-used solenoid" is a solenoid corresponding to each of the pre/post-change gear positions when a gear shift operation is performed or is going to be performed to shift the current, pre-change gear position to an "outputtable" post-change gear position.

After receiving a gear shift instruction, it is possible to increase the control speed (i.e., the controllability) during the actual shifting, i.e., during the period Tm2.

Since the controller 7 changes the current feedback cycle of the target solenoid (e.g., 11b to 11d) from the current feedback cycle of the non-target solenoid (e.g., 11a), the controller 7 is enabled to perform a feedback control of the electric current in a relatively-long cycle Tlng and is enabled to lighten the process load, in comparison to performing the current feedback control in a uniform/constant feedback cycle, that is, for all the solenoids. In other words, the controller 7 lightens its processing load and consequently the processing load of CPU 9 by varying the cycle of the current feedback control for the solenoids so that the current cycle is not the same for all the solenoids.

In particular, the controller 7 increases the control speed (i.e., the controllability) by setting the current feedback cycle for the target solenoid (for example, 11b to 11d) corresponding to the gear position to which the gear shift operation is currently performed or the gear shift operation that may be possibly performed (i.e., predicted or probable shift operation) to the short cycle Ts. Thus, the processing load can be reduced by the controller 7 by setting the current feedback cycle for the other, non-target solenoids (e.g., 11a) to the long cycle Tlng.

Since the controller 7 narrows or sifts the potential "could-be-used" gear positions to one or more gear positions based on the operation state and the in-vehicle state, it is not necessary for the controller 7 to consider the possibility of shifting to all of the gear positions. In such manner, the narrowing or sifting operation of the controller 7 keeps the controller 7 from raising the control speed (i.e., the controllability) of all the solenoids 11a to 11d. As a result, a range of the target solenoids to operate can be narrowed to one or a select few, and the processing load can be reduced.

Since the controller 7 distinguishes between target solenoid(s) that are to be operated and non-target solenoids that are not operated based on the driving/driven state and engagement/disengagement of components between the engine system 2 and the transmission mechanism 3b, that is, based on the driving/driven state in the slip-engagement situation of the drivetrain components between the engine system 2 and the transmission mechanism 3b, the target solenoid(s) is/are narrowed down to one or a few based on the state of the input torque to the transmission mechanism 3b.

Second Embodiment

Figure 12:
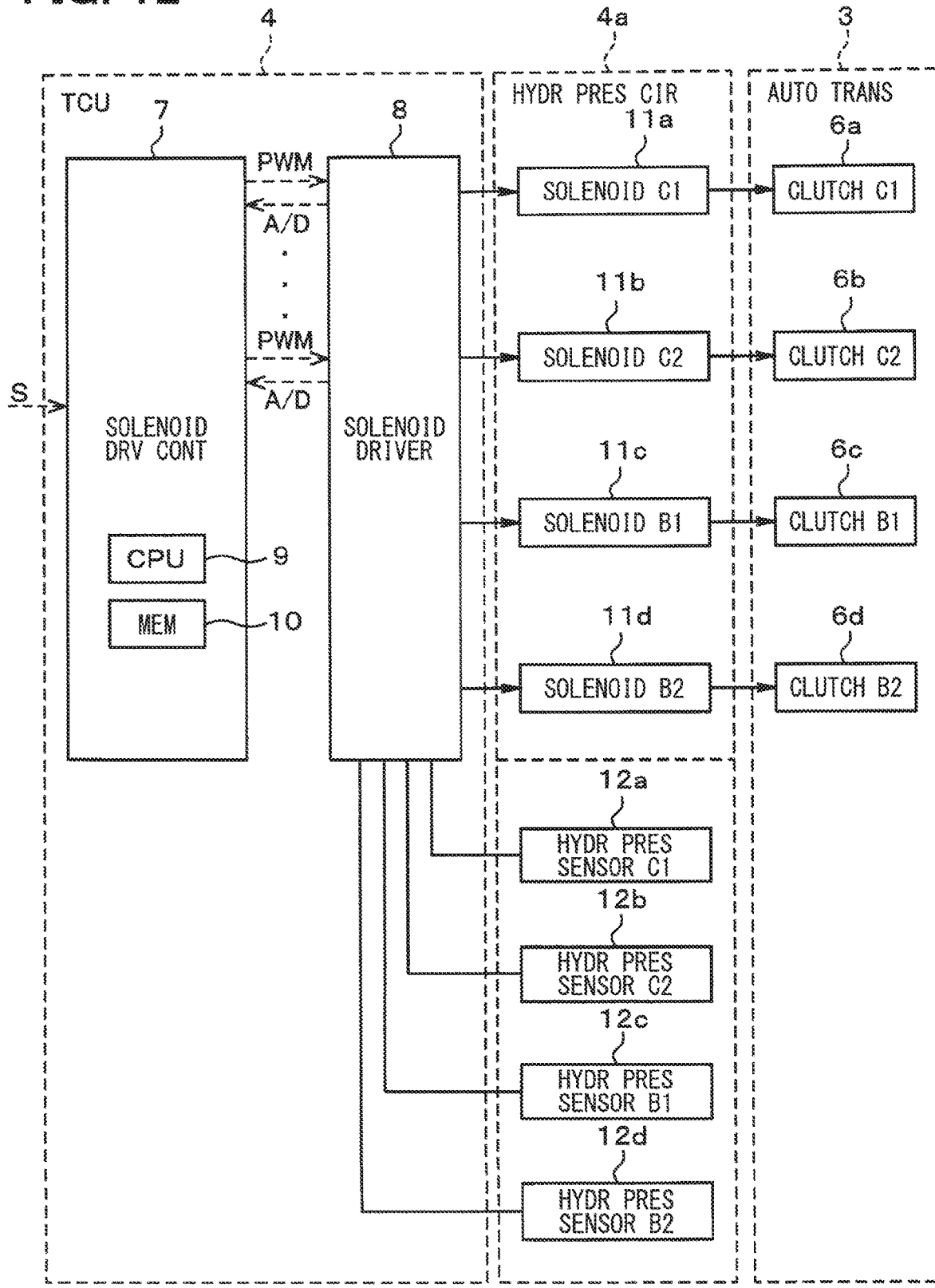
FIG. 12 is a block diagram of an electrical configuration for operating an automatic transmission in a second embodiment of the present disclosure.
Figure 13:
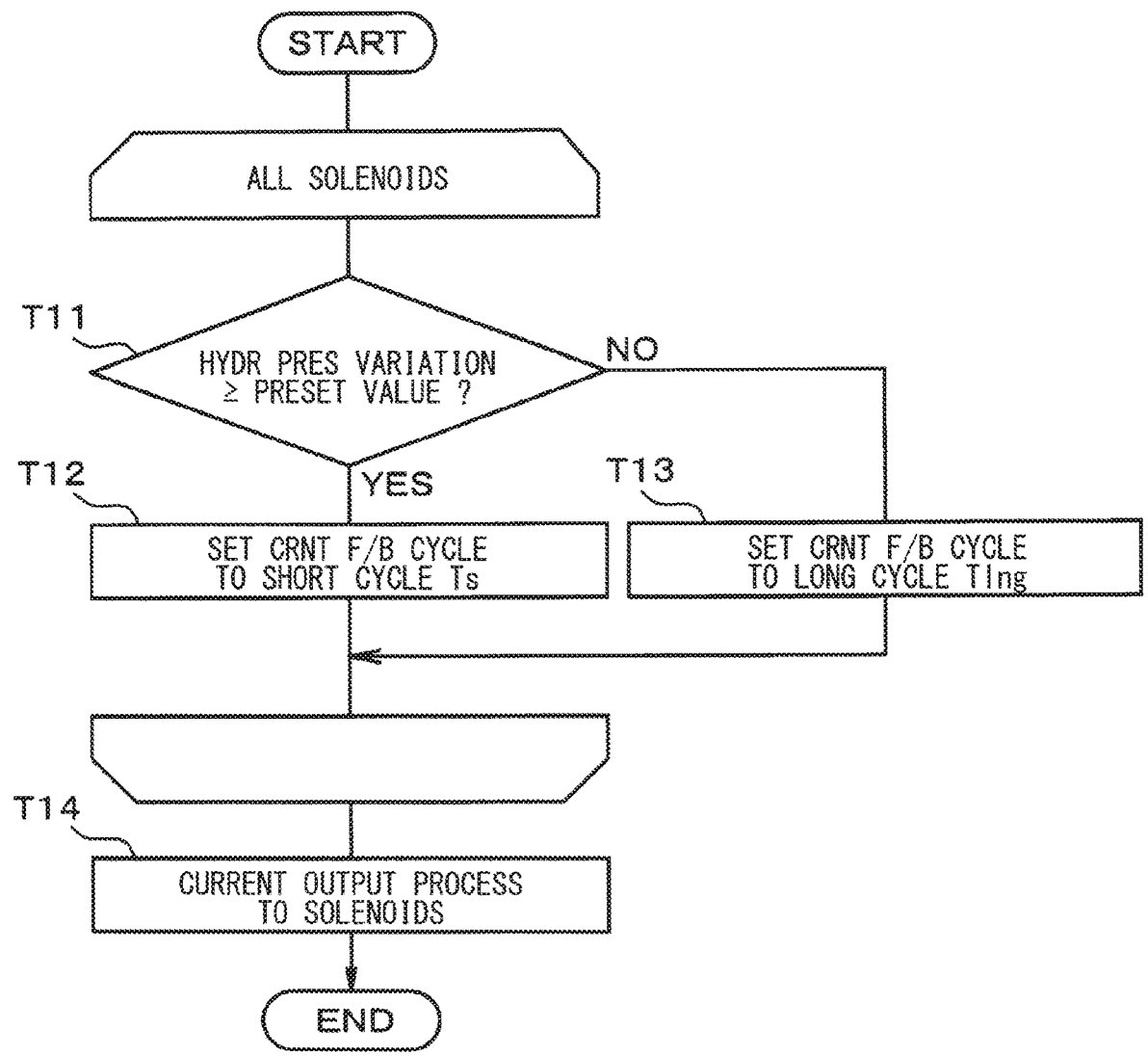
FIG. 13 is a flowchart of a process corresponding to a hydraulic sensor value of a hydraulic pressure sensor.
Figure 14:
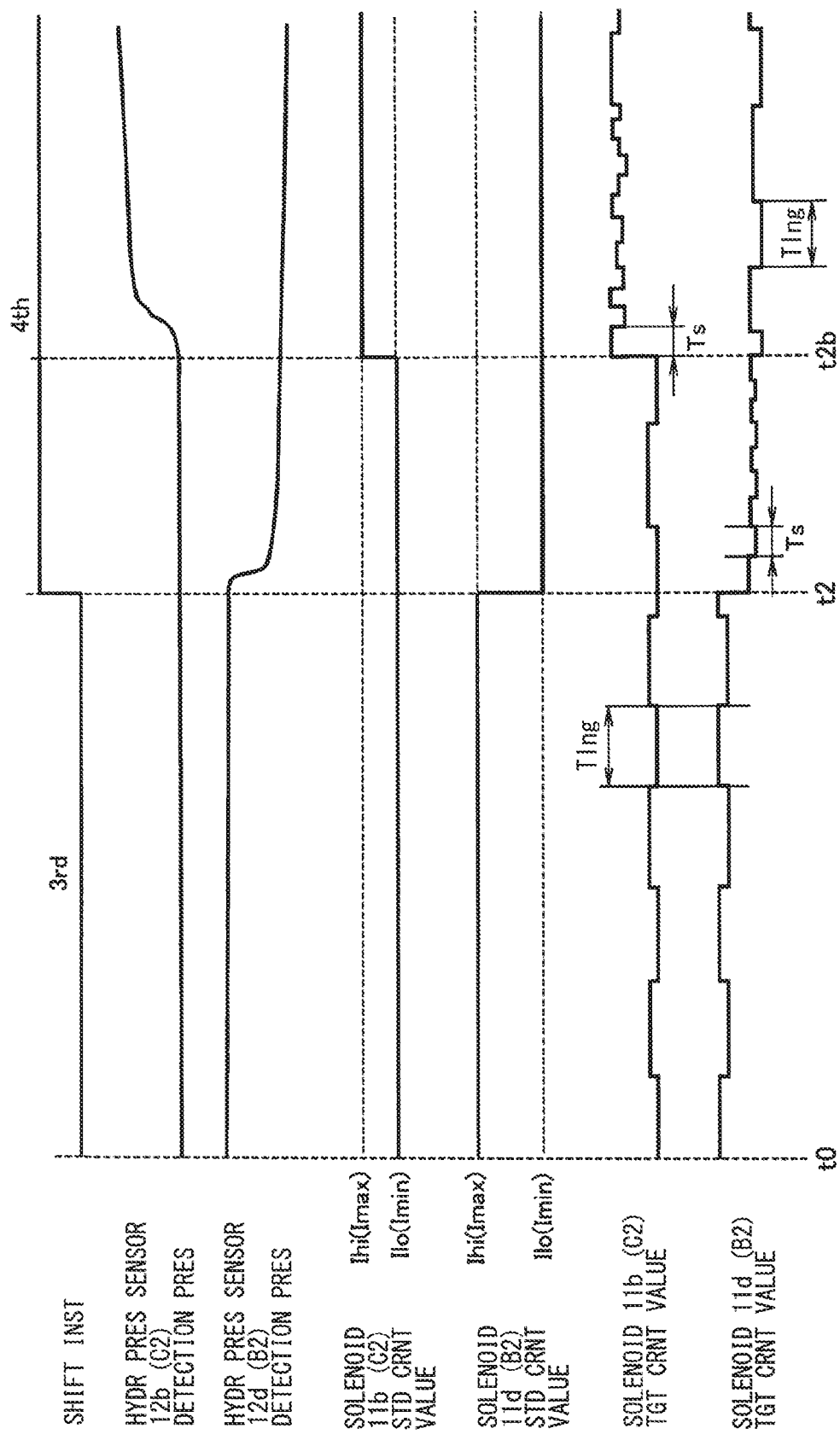
FIG. 14 is a modification of the timing chart shown in FIG. 11.

FIGS. 12 to 14 illustrate the second embodiment of the present disclosure. In the present embodiment, an operation mode is described in which the current feedback cycle is switched between a short cycle and a long cycle based on an amount of change or variation in the actual hydraulic pressure of a solenoid, as detected by a hydraulic pressure sensor. FIG. 12 illustrates a functional block diagram. As shown in FIG. 12, hydraulic pressure sensors 12a to 12d are installed in the hydraulic circuit 4a.

These hydraulic pressure sensors 12a to 12d are respectively provided to correspond to the solenoids 11a to 11d of the hydraulic circuit 4a. These hydraulic pressure sensors 12a to 12d detect hydraulic pressure values that are hydraulically controlled by the solenoids 11a to 11d. In other words, the pressure sensors 12a to 12d may detect a hydraulic pressure of the hydraulic fluid in the corresponding solenoids 11a to 11d.

In the present embodiment, the control unit 7 is configured to realize various functions by the CPU 9 executing a program stored in the memory 10. For example, the control unit 7 may function as a cycle changer to change the current feedback cycles of the solenoids 11a to 11d. The control unit 7 may also function as hydraulic pressure variation comparator to compare the hydraulic pressure variations as measured by the hydraulic pressure sensors 12a to 12d. Other than the configurations and functions described above in the present embodiment, the control unit 7, the TCU 4, the hydraulic circuit 4a, and the automatic transmission 3 may be configured and function the same as those described in the first embodiment. As such, a repeat description of the configurations and functions are omitted.

The operation and effects of the above-described configuration are described with reference to FIGS. 13 and 14.

FIG. 13 is a flowchart of a process in a middle of a control that changes the current feedback cycle of a solenoid (e.g., 11a to 11d) to the short cycle Ts during the shift progress period Tm2. The shift progress period Tm2 is described in the first embodiment with reference to FIGS. 9, 10, and 11.

It should be noted that FIG. 13 shows a loop limit hexagon before the process at T11 and a loop limit hexagon after T12 and T13 and before T14. These loop limit symbols indicate the start and end of a loop performed in the flowchart of FIG. 13. "ALL SOLENOIDS" in the beginning loop symbol indicates that the processes from T11 to T13 are not performed by the controller 7 simultaneously for all of the solenoids 11a, 11b, 11c, and 11d, but rather one-by-one in a sequential order. For example, the controller 7 may run the process first for solenoid 11a, then solenoid 11b, and so on.

The controller 7 can perform a high precision and high responsiveness control for the solenoids 11a to 11d and their corresponding clutches 6a to 6d by setting the current feedback cycle to the short cycle Ts. However, such a high precision and high responsiveness control is only necessary for a transition period in which the standard current value is either changed from the low value Ilo to the high value Ihi, or from the high value Ihi to the low value Ilo, until the hydraulic pressure control is complete by matching the controlled current value to the target current value. Therefore, by estimating a duration of such a transition period, it is possible to limit the time for setting the current feedback cycle to the short cycle Ts and to limit increases to the processing load of the controller 7 and CPU 9 to a minimum amount.

When a per-unit-time variation of the detected actual hydraulic pressure from at least one of the hydraulic pressure sensors 12a to 12d is equal to or greater than a predetermined value, such variation suggests that the actual hydraulic pressure is in the process of changing via the hydraulic control by the solenoids 11a to 11d. As such, it is assumed/estimated that the standard current value occurs just after the transition either from the low value Ilo to the high value Ihi, or from the high value Ihi to the low value Ilo, where both indicate that the hydraulic pressure control is still in progress. FIGS. 9 to 11 in the first embodiment illustrate the output hydraulic pressure that occurs during the shift progress period Tm2.

As shown in FIG. 13, at T11 the controller 7 targets all the solenoids 11a to 11d to determine whether the per-unit-time variation of the detection value of one or more of the hydraulic pressure sensors 12a to 12d is equal to or greater than a predetermined value. When the controller 7 determines that the detection value of one or more of the hydraulic pressure sensors 12a to 12d is equal to or greater than the predetermined value, i.e., "YES" at T11, the process proceeds to T12. At T12, the controller 7 sets the current feedback cycle to the short cycle Ts for the solenoid(s) whose pressure(s) exceeds the predetermined value.

Returning to T11, when the controller 7 determines that the per-unit-time variation of the detection value of the respective hydraulic pressure sensors 12a to 12d is less than the predetermined value, i.e., "NO" at T11, the process proceeds to T13. At T13, the controller 7 sets the current feedback cycle to the long cycle Tlng for the relevant solenoids.

After setting an appropriate cycle for each of the solenoids 11a to 11d at T12 or T13, the process proceeds to T14 and the controller 7 outputs an electric current to each of the solenoids 11a to 11d. Thus, the current feedback control can be performed by changing the current feedback cycle of all the solenoids 11a to 11d.

When the controller 7 compares the hydraulic pressure of the solenoids 11a to 11d as sensed by the pressure sensors 12a to 12d against a threshold value at T11, the controller 7 performs a hydraulic pressure variation comparison function. As such, the controller 7 performing the process at T11 may be referred to as "a hydraulic pressure variation comparator."

When the controller 7 sets the current feedback cycle for the to the short cycle Ts for solenoids having excessive pressure variations at T12 and outputs the short-cycle electric current to those solenoids at T14, the controller is performing a cycle changing process. As such, the controller 7 may be referred to as a "cycle changer" when the controller 7 performs both the T12 and T14 processes.

As shown in FIG. 14, when the controller 7 inputs a shift instruction at time t2 to control the standard current value of the solenoid 11d (B2) to change from the high value Ihi to the low value Ilo, the detected hydraulic pressure of the hydraulic pressure sensor 12d (B2) significantly changes after time t2. However, the amount of change, that is, the variation, in the detected hydraulic pressure gradually decreases at time continues to elapse after time t2. As such, when the amount of change (i.e., variation) of the detected hydraulic pressure falls to be less than the predetermined value at time t2b, the controller 7 returns the current feedback cycle of the solenoid 11d (B2) from the short cycle Ts to the long cycle Tlng at time t2b. In such manner, increases to the processing load of the controller 7 and CPU 9 are kept at minimum levels. Performing such a process may also be used as an index for determining whether the gear position is currently being shifted to the post-change gear position or whether the shift to the post-change gear position is already completed.

Third Embodiment

Figure 15:
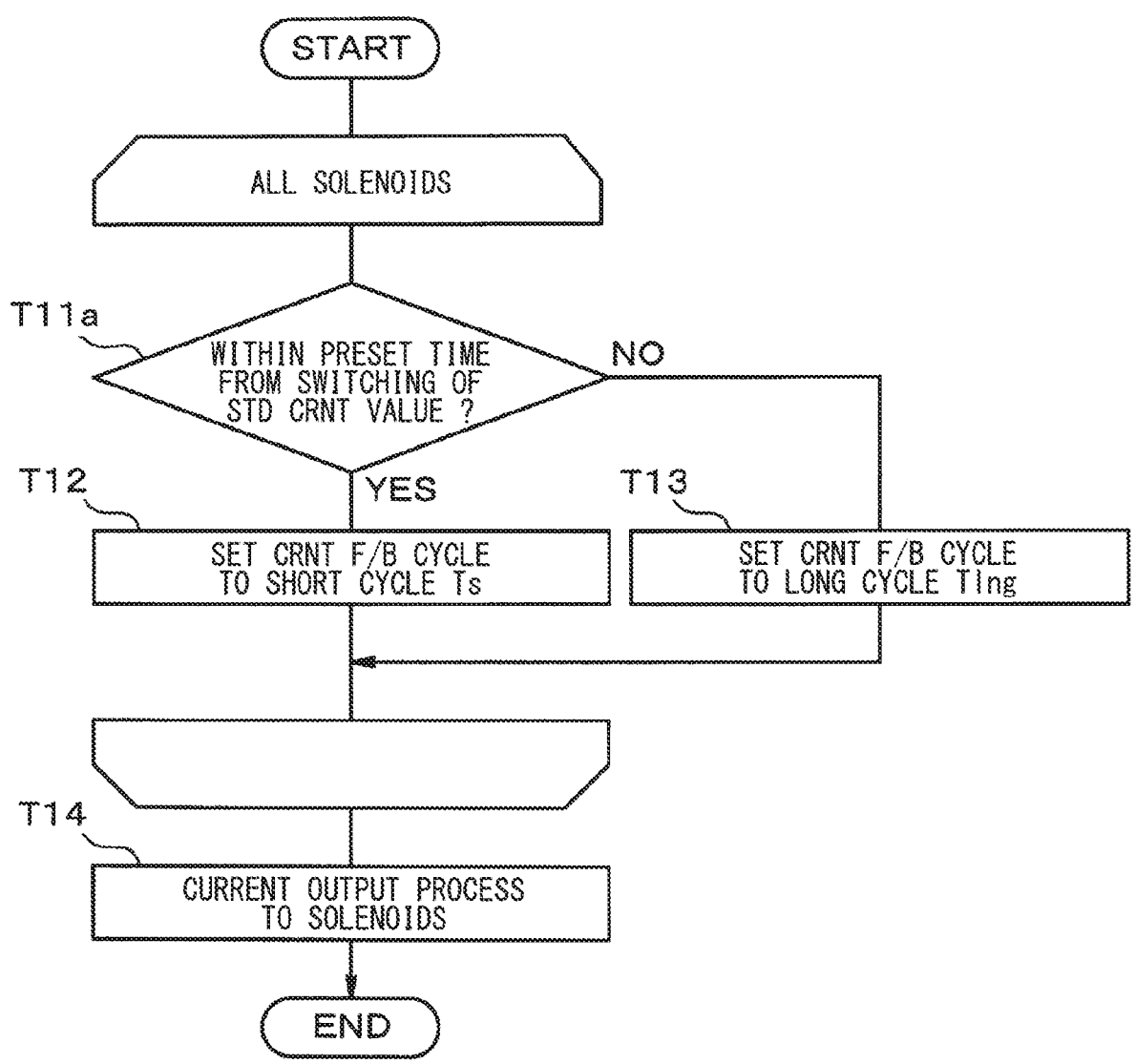
FIG. 15 is a flowchart of a process based on a switching time of a standard current value in a third embodiment of the present disclosure.

FIG. 15 illustrates a third embodiment of the present disclosure. FIG. 15 illustrates a flowchart similar to the flowchart shown in FIG. 13. In FIG. 15, the process at T11a may be used in place of the process at T11 in FIG. 13. In the present embodiment, the control unit 7 realizes various functions by the CPU 9 executing a program stored in the memory 10. Such functions may include time measurement.

At T11a, the controller 7 determines whether the current time falls within a predetermined period of time is after switching the standard current value. The predetermined period of time is measured starting when the standard current value of a solenoid is switched. If the controller 7 determines that the current time is still within the period after the standard current is switched, i.e., "YES" at T11a, the process proceeds to T12. At T12, the controller 7 sets the current feedback cycle to the short cycle Ts.

Returning to T11a, if the controller determines that the current time has exceeded the predetermined period following the switching of the standard current of the solenoid, that is, the current time falls outside of the predetermined time period following the switching of the standard current of the solenoid, i.e., "NO" at T11a, the process proceeds to T13. At T13 the controller 7 sets the current feedback cycle back to the long cycle Ting. That is, referring again to FIG. 14, the current feedback cycle is returned to the long cycle Tlng on a condition that a predetermined amount of time from time t2 to time t2b has elapsed. The predetermined amount of time from time t2 to time t2b is the predetermined amount of time after the standard current of the solenoid 11d(B2) is switched. After this predetermined amount of time elapses, the current feedback cycle switches back to the long cycle Tlng. In other words, in the present embodiment, the controller 7 returns the current feedback cycle for a solenoid to the long cycle Tlng a predetermined amount of time after the standard current value of the solenoid is switched. In such manner, the processing load to the controller 7 and the CPU 9 can be kept at a minimum level.

When the controller 7 compares whether the current time falls within a predetermined period following the switching of the standard current of a solenoid at T11a, the controller 7 performs a time measurement function. As such, the controller 7 performing the process at T11a may be referred to as "a time measurement unit."

When the controller 7 sets the current feedback cycle for the solenoid to the short cycle Ts when the standard current value for a solenoid has been switched and the current time falls within a predetermined period following the switch of the standard current at T12 and outputs the short-cycle electric current to those solenoids at T14, the controller is performing a cycle changing process. As such, the controller 7 may be referred to as a "cycle changer" when the controller 7 performs both the T12 and T14 processes.

Other Embodiment

The present disclosure is not limited to the above-described embodiments, that is, the embodiments of the present disclosure may be modified or expanded.

That is, two or more embodiments described above may be combined to implement the control of the present disclosure, and portions of the above-described embodiments, either from single embodiments alone or a plurality of embodiments in combination, may be eliminated. Additionally, various modifications of the present disclosure may be considered as encompassed in the present disclosure, as long as such modifications pertain to the gist of the present disclosure.

Although the present disclosure is described based on the above embodiments, the present disclosure is not limited to the disclosure of the embodiments and the structures. The present disclosure is intended to cover various modification examples and equivalents thereof. In addition, various modes/combinations, one or more elements added/subtracted thereto/therefrom, may also be considered as the present disclosure and understood as the technical thought thereof.

What is claimed is:

1. An automatic transmission controller comprising:
a current controller configured to perform a feedback control of an electric current to at least one of a plurality of solenoids, the plurality of solenoids for shifting to one of a plurality of gear positions in a transmission mechanism; and a distinguisher configured to distinguish (i) a target solenoid t from (ii) a non-target solenoid other than the target solenoid when a pre-change gear position of the transmission mechanism is currently shifted or is going to be shifted to a post-change gear position by an operation of the target solenoid which is provided to correspond to the post-change gear position, wherein the current controller further configured to set a different feedback cycle of the electric current to the target solenoid(s) which is different from a feedback cycle of the electric current to the non-target solenoid based on the distinction established by the distinguisher between the target solenoid(s) and the non-target solenoid(s).

2. The automatic transmission controller of claim 1 further comprising:

an input section configured to input an operation state of a driver and an in-vehicle state of a vehicle, wherein when the distinguisher distinguishes the target solenoid from the non-target solenoid, the distinguisher is further configured to narrow the post-change gear positions to which the gear position is going to be shifted to one or more gear positions based on (i) the operation state of the driver and (ii) the in-vehicle state of the vehicle respectively input by the input section.

3. The automatic transmission controller of claim 1, wherein when the distinguisher distinguishes the target solenoid from the non-target solenoid, the target solenoid is distinguished from the non-target solenoid based on a driving-driven state of a slip-engagement situation of components between an engine system and the transmission mechanism.

4. The automatic transmission controller of claim 1 further comprising:

a cycle changer configured to change a current feedback cycle of the solenoid to a short cycle; and a hydraulic pressure variation comparator configured to compare (i) a variation of an actual hydraulic pressure by the control of the electric current performed by the current controller to the solenoid with (ii) a preset value, wherein the cycle changer is further configured to change the current feedback cycle of the solenoid from the short cycle to a long cycle when the variation of the actual hydraulic pressure is determined to be less than the preset value by the hydraulic pressure variation comparator.

5. The automatic transmission controller of claim 1 further comprising:

a cycle changer configured to change a current feedback cycle of the solenoid to a short cycle; and a time measurement unit configured to measure a preset time from a change of a standard current value supplied to the solenoid, wherein the cycle changer is further configured to change the current feedback cycle of the solenoid from the short cycle to a long cycle on a condition that the preset time is measured as a lapse time by the time measurement unit.

* * * * *